(12) United States Patent
Alanis et al.

(10) Patent No.: US 8,996,743 B1
(45) Date of Patent: *Mar. 31, 2015

(54) EVENT DRIVEN REMOTE DIRECT MEMORY ACCESS SNAPSHOTS

(71) Applicant: International Business Machines Corporation, Armonk, NY (US)

(72) Inventors: Francisco J. Alanis, Cedar Park, TX (US); Omar Cardona, Cedar Park, TX (US); Pedro V. Torres, Pflugerville, TX (US); Michael P. Vageline, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,781

(22) Filed: Nov. 13, 2013

Related U.S. Application Data

(63) Continuation of application No. 14/036,543, filed on Sep. 25, 2013.

(51) Int. Cl.
```
G06F 3/00       (2006.01)
G06F 11/14      (2006.01)
G06F 11/07      (2006.01)
G06F 13/28      (2006.01)
```
(52) U.S. Cl.
CPC ........ *G06F 11/1451* (2013.01); *G06F 11/0793* (2013.01); *G06F 13/28* (2013.01)
USPC .......................................................... 710/8

(58) Field of Classification Search
None
See application file for complete search history.

(56) References Cited

U.S. PATENT DOCUMENTS

| | | | |
|---|---|---|---|
| 2002/0078404 A1* | 6/2002 | Vachon et al. | 714/38 |
| 2005/0102396 A1* | 5/2005 | Hipp | 709/224 |
| 2006/0045005 A1 | 3/2006 | Blackmore et al. | |
| 2006/0047867 A1 | 3/2006 | Craddock et al. | |
| 2006/0126619 A1* | 6/2006 | Teisberg et al. | 370/389 |
| 2006/0259570 A1 | 11/2006 | Feng et al. | |
| 2008/0209304 A1* | 8/2008 | Winarski et al. | 714/763 |
| 2010/0122148 A1* | 5/2010 | Flynn et al. | 714/773 |
| 2011/0231718 A1* | 9/2011 | Oberlaender | 714/718 |
| 2012/0131413 A1* | 5/2012 | Thatcher et al. | 714/758 |
| 2012/0144233 A1* | 6/2012 | Griffith et al. | 714/13 |
| 2012/0317439 A1* | 12/2012 | K. et al. | 714/6.22 |

OTHER PUBLICATIONS

U.S. Appl. No. 14/036,543.
Anonymous, et al., "Method and Apparatus for adapter teaming on stateful offload connections", IPCOM000220487D, Aug. 1, 2012, 5 pages.
Internet Society, et al., "A Remote Direct Memory Access Protocol Specification (RFC5040)", IPCOM000159868D, Nov. 1, 2007, 68 pages.

* cited by examiner

*Primary Examiner* — Elias Mamo
(74) *Attorney, Agent, or Firm* — Stephen J. Walder, Jr.; Thomas E. Tyson

(57) ABSTRACT

Mechanisms are provided, in a data processing system, for generating a snapshot of a remote direct memory access (RDMA) resource. The mechanisms receive, from an Input/Output (IO) adapter associated with the data processing system, an error event notification and store, in response to the error event notification, a snapshot of a RDMA resource associated with the error event notification. The mechanisms tear down the RDMA resource in response to the error even notification and free memory associated with the RDMA resource in response to tearing down the RDMA resource. The snapshot stores contents of the RDMA resource.

20 Claims, 5 Drawing Sheets

EVENT DRIVEN REMOTE DIRECT MEMORY ACCESS SNAPSHOTS

This application is a continuation of application Ser. No. 14/036,543, filed Sep. 25, 2013, status pending.

BACKGROUND

The present application relates generally to an improved data processing apparatus and method and more specifically to mechanisms for performing event driven Remote Direct Memory Access (RDMA) snapshots of resources, such as completion queues (CQs) and Queue Pairs (QPs).

Input/Output (IO) technologies such as RDMA require fully stateful offload capable IO adapters. With IO adapters using such technologies, the operating system provides connection state information to the IO adapters and hands off the processing of communications of data through these connections to the IO adapter itself, e.g., TCP/IP protocol stack processing or the like. These IO adapters encompass the standard Open Systems Interconnection (OSI) network and transport layers (layers 3 and 4) within the physical adapter domain. This differs from traditional kernel mediate multiplexed communication where the OSI layers 2-n are resident in the operating system.

SUMMARY

In one illustrative embodiment, a method, in a data processing system, is provided for generating a snapshot of a remote direct memory access (RDMA) resource. The method comprises receiving, by the data processing system, from an Input/Output (IO) adapter associated with the data processing system, an error event notification and storing, by the data processing system in response to the error event notification, a snapshot of a RDMA resource associated with the error event notification. The method further comprises tearing down, by the data processing system, the RDMA resource in response to the error event notification. Moreover, the method comprises freeing, by the data processing system, memory associated with the RDMA resource in response to tearing down the RDMA resource, wherein the snapshot stores contents of the RDMA resource.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
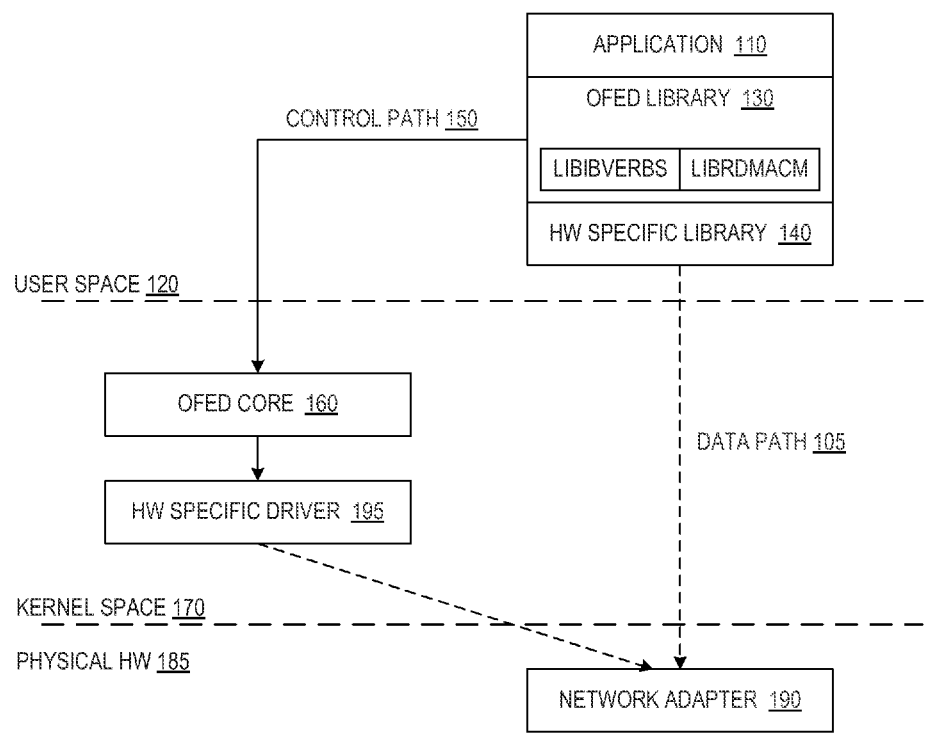
FIG. 1 is an example of an RDMA model that utilizes an Open Fabrics Enterprise Distribution (OFED™) core in accordance with one illustrative embodiment.

As mentioned above, modern input/output (IO) technologies such as Remote Direct Memory Access (RDMA) make use of IO adapters that are fully stateful offload capable IO adapters. RDMA is a functionality that allows direct memory access from the memory of one computer into that of another computer, computing device (such as an IO adapter), or the like, without involving either computer's operating system. RDMA facilitates high throughput, low-latency networking, which is especially useful in massively parallel computer clusters.

RDMA supports zero-copy networking by enabling the network adapter of a computer to transfer data directly to or from application memory, thereby eliminating the need to copy data between the application memory and the data buffers in the operating system. Such direct transfers of data do not require any work to be done by the processors, cache memories, or the like, and do not require context switches. Such direct transfers may be performed in parallel with other system operations that the computers are performing. For example, when an application performs a RDMA Read or Write request, the application data is delivered directly to the network via a RDMA enabled network adapter, reducing the latency of the transfer.

Many modern architectures and specifications are designed with RDMA and RDMA enabled network adapters in mind. For example, the InfiniBand™ specification maintained and furthered by the InfiniBand™ Trade Association (IBTA), and InfiniBand™ architectures developed by International Business Machines Corporation of Armonk, N.Y., provide support for RDMA operations to be performed via the InfiniBand™ fabric. Similarly, the Open Fabrics Enterprise Distribution (OFED™) specification and architecture, maintained and furthered by the Open Fabrics Alliance (OFA), and which is built upon the InfiniBand™ specification, also provides support for RDMA operations. These architectures provide various different structures for performing RDMA operations and IO communication including Queue Pairs (QPs) comprising transmit and receive Work Queues (WQs), Completion Queues (CQs), Event Queues (EQs), For more information about InfiniBand™ and OFED™, additional information may be obtained from the IBTA and OFA organizations and corresponding websites. The following description of the illustrative embodiments will assume an architecture of the type specified in the OFED™ specification, in which queue structures are used to facilitate IO operations, including RDMA operations. However, it should be appreciated that the illustrative embodiments are not limited to such. Rather, the illustrative embodiments may be employed in any architecture that utilizes a stateful offload IO model such that IO state/context information is maintained at the IO adapter hardware rather than the operating system level and may be lost in the event of an error occurring.

That is, while stateful offload IO models provide high performance IO with minimal overhead costs, they are inherently difficult to maintain since the states/contexts describing the status and behavior of an IO connection (i.e. OSI layers 3-4) are abstracted from the operating system and resident on the adapter hardware. Once the network and transport layers are removed from the operating system and under the IO adapter's control, the operating system Remote Access Services (RAS) advantages are lost. For example, when the network and transport layers are resident in the operating system kernel via the traditional multiplexed kernel mediate IO mechanisms, there is a common point of service and maintenance. This commonality can leverage system dump, perform, and other operating system specific RAS tools, whereas such is not possible when the transport and network layer processing is offloaded to the IO adapter.

The illustrative embodiments provide mechanisms for event driven, non-disruptive, userspace RDMA resource snapshots, such as snapshots of Completion Queues (CQs) and Queue Pairs (QPs). The illustrative embodiments enable non-disruptive RAS snapshot capability to capture the state and context of offloaded IO resources for both userspace and kernelspace. It should be appreciated that the terms "userspace" and "kernelspace" as they are used herein are used in accordance with the conventional understanding of these terms to represent two distinct regions of system memory in which user processes execute and corresponding data are stored (i.e. the userspace) and in which the kernel (core of the operating system) executes and provides its services as well as stores the corresponding data (i.e. the kernelspace). The kernelspace can be accessed by userspace processes only through the use of system calls to services performed by the kernel, such as IO services. IO refers to any program, operation, or process that transfers data to/from a host system from/to a peripheral device, e.g., disk driver, IO adapter, network adapter, or the like. Stateful IO offload refers to an architecture in which the control and maintenance of IO operations is offloaded to an IO adapter which stores the state and context information for the IO connection between the IO adapter and the userspace applications.

The de-facto operational behavior of stateful IO offloads is for the process, either user space or kernel space application process, to close a connection/resource when an error is detected. This follows the typical sockets semantic where if a socket error is detected, the socket is closed and application level failover to another socket or IO channel is used. When a socket or offloaded IO resource, e.g., QP or CQ, is closed, all of the context and state information about the connection is destroyed on the IO adapter.

With the mechanisms of the illustrative embodiments, however, when an error event is detected on a userspace offloaded IO resource, the illustrative embodiments immediately perform a snapshot to a safe storage location and proceed to allow the error notification for standard resource/socket closure behavior. It should be appreciated that the mechanisms for performing the snapshot do not change logic in the userspace or kernelspace processes while providing a mechanism for autonomously capture the necessary first failure data collection (FFDC) information to allow for post-mortem root cause error analysis.

The snapshot that is performed is of the RDMA resources associated with the error notification. The term "resource" as it is used herein refers to any metadata data structure passed down to the IO adapter by the user of the OFED or kernel core, or by the kernel itself, that will allow the adapter to access memory, assign processing cycles, and receive routing instructions necessary for data transmission. Examples of such RDMA resources include, but are not limited to, Queue Pairs (QPs), Completion Queues (CQs), Protection Domains (PDs), Event Queues (EQs), Address Handles (AHs), and Contexts (CTXs). For purposes of the following description, it will be assumed that the RDMA resources that are the subject of the snapshot operation are the QPs and CQs, however the illustrative embodiments may also be applied to any other RDMA resource depending on the desired implementation.

The resources snapshot operation is passive from a userspace point of view and thus, is non-disruptive to the userspace applications. The resource contents are in a userspace address space of memory with a shadow copy of the resource, comprising a resource descriptor, being present in a kernelspace address space of memory along with event detection logic being present in the kernelspace. Thus, the mechanisms of the illustrative embodiments span both address spaces and acquires all state information and entities from both address spaces. This is achieved by acquiring all of the necessary addressability information at resource creation time and asynchronously reading and coalescing all contents as a set of kernelspace operations on error event detection. The contents are placed in persistent flight recorder memory which can be inspected, analyzed, output, and otherwise processed postmortem, i.e. after the resource/connection is torn down, to perform root cause error analysis, error recovery, or any other operations for addressing the error event.

It should be appreciated that, with the mechanisms of the illustrative embodiments, there are two separate views of a resource. A first view comprises kernel memory addressing data used to locate the actual resource. This first view is a small description view that identifies the location and size of the resource, i.e. a resource descriptor. The second view is a view of the actual resource that is used by the IO adapter to perform RDMA operations. The second view comprises the metadata contents of the resource itself. The first view is used by the userspace and kernelspace (through a shadow copy) to handle memory allocation and de-allocation of the resource. The second view contains the actual metadata that describes where the data to be transmitted is located in memory, where it should be transmitted, etc. The first view identifies the location in memory of the second view.

Thus, when it is stated above that all of the necessary addressability information is acquired at resource creation time, this is referring to the first view of the resource that identifies the location in memory of the second view, i.e. the actual metadata contents of the resource that are used by the IO adapter to perform RDMA operations. When it is stated above that all contents are read and coalesced, this refers to the second view, i.e. the metadata contents of the actual resource that the adapter accesses to perform RDMA operations.

With the mechanisms of the illustrative embodiments, at IO adapter driver configuration time, a flight recorder data structure (or simply "flight recorder") is created within the IO adapter driver's memory in kernel space. In the way of explanation as to the benefit of having the flight recorder stored in the IO adapter drivers' memory in kernel space, consider that that kernel has an unrestricted view of all the memory in the system and references memory directly using a specific addressing space referred to as the kernelspace. Regular applications do not have a view of all the memory and instead, the operating system assigns some memory to the application for use, but gives the application an unlimited set of addresses to work with. Thus, from the view of the application, the application has access to all the memory, but this is simulated only. As a result, the operating system provides a completely new addressing space specific to each application, referred to as the userspace.

One of the tasks of an RDMA driver is to perform the translation between what a user application sees in its userspace, and the actual memory in the kernelspace that the operating system recognizes, and then communicate to the IO adapter what that memory is so that the IO adapter can read it or write to it. When the read/write from/to the IO adapter happens, that read/write is reflected to the userspace application in the application's userspace. Once an application is terminated, its userspace address space is terminated as well.

Thus, the value of having the flight recorder in the kernelspace is that the kernel can do a translation of the addresses from userspace to their actual location in kernelspace and in a post mortem scenario. The userspace addresses will make sense and will be easily accessible because those are addresses that the operating system understands in kernelspace. If the flight recorder were in the userspace, the addresses would be relative to the application's userspace and, because the application might not be running anymore, those addresses would be meaningless and the data in that flight recorder would essentially be useless.

The flight recorder is a configurable data structure containing a pre-specified number of entries and size of each entry. As each resource, e.g., QP or CQ, in userspace is created, the associated kernelspace shadow copy captures the memory properties associated with the resource, namely all the data necessary to fully describe memory being used to store data being sent or received by the IO adapter via the resource, e.g., memory start address, memory end address, memory size in bytes, IO mapping address, and the like. This information is used in subsequent operations to generate snapshots of the resources in response to the detection of an error event. That is, when an error event occurs and an error notification is posted to the EQ identifying the resource associated with the error event, the illustrative embodiments utilize a cross memory map (xmap) service to perform a cross memory read of the userspace resource and write the contents of the resource into an entry in the flight recorder, thereby storing a snapshot of the userspace resource in the flight recorder. In addition, a kernelspace shadow copy of the corresponding QP may also be copied into the flight recorder. Thereafter, the error notification is processed so as to notify the OFED core in the kernelspace that the resource is in an error state and appropriate operations are performed to tear down the resource. Since the contents of the resource at the time of the error are maintained in the snapshot in the flight recorder, this information may then be analyzed to determine a root cause of the error and appropriate actions can be performed to avoid the error from occurring again in the future.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

To further illustrate the mechanisms and their operations in accordance with the illustrative embodiments, reference is now made to the figures which depict example embodiments. FIG. 1 is an example of an RDMA model that utilizes an Open Fabrics Enterprise Distribution (OFED) core in accordance with one illustrative embodiment. It should be appreciated that the elements of the userspace and kernelspace shown in FIG. 1 may be implemented as software instructions executed by one or more processors of a host system. The IO adapter in the physical hardware level of FIG. 1 may be implemented as a hardware device in which software instructions are executed on one or more processors, firmware is provided, memory is provided, and/or the like, to facilitate operations being performed by the IO adapter hardware.

As shown in FIG. 1, an application 110 is present in the user space 120 and makes calls to, or otherwise invokes, library functions for performing RDMA operations via an OFED™ library 130 and hardware specific library 140. The OFED library 130 comprises verbs library (libibverbs) and DMA connection manager library (librdmacm) which may be used via a control path 150 to communicate with an OFED core 160 in the kernel space 170 of the operating system. The verbs in the library 130 are a part of the OFED™ package and provide the applications linking to the library 130, e.g., application 110, with the verb Application Program Interface (API) that the application can use to make use of RDMA functions. Both sub-libraries libibverbs and librdmacm contain verbs with the libibverbs being resource related while the librdmacm verbs are used to handle the protocol to connect queue pairs between the local and remote systems. In essence, the OFED™ library 130 contains the application level support for the defacto standard of OFED™ and provides the APIs for implementation of RDMA.

The OFED™ core 160 provides the remaining portions of the OFED™ RDMA mechanisms including the operating system kernel level verb APIs as well as the bulk of the hardware agnostic implementation of the RDMA protocol. The OFED™ core 160 may communicate with the IO adapter 190 at the physical hardware level 185 via a hardware specific device driver 195. The hardware specific device driver 195 and the hardware specific library 140 may be specific to the type of network adapter 190 being used in the particular implementation.

As can be seen from FIG. 1, the data path 105 flows directly from the application 110 in the user space 120 to the IO adapter 180 in the physical hardware level 185, and vice versa, via RDMA operations performed using the OFED™ library 130 and hardware specific library 140. Control path communications with the network adapter 190 are still routed via the control path 150 to the OFED™ core 160 and hardware specific device driver 195 in the kernel space 170.

Using this architecture, the upper layer protocol (ULP) performs resource creation on the network adapter 190. It should be appreciated that ULP refers to either application or other code that is higher up on the protocol stack in a protocol model, e.g., the OSI model. For example, code that is directly using the OFED™ verbs may be an application at an application layer, but could also be user Direct Access Programming Library (uDAPL), i.e. an application space user, that could be used in turn by a middleware layer that is itself used by the application, e.g., DB2 for example. The term ULP refers to the direct user of the code in this scenario (i.e. the direct user of the OFED verbs), without narrowing the ULP to an application which may be many levels removed.

The ULP performs explicit calls to allocate and map resources for Direct Memory Access (DMA) on the device, e.g., the IO adapter 190. Thus, the RDMA driver, i.e. a device driver instance for the particular device, e.g., IO adapter 190, which is registered by the hardware specific driver 195 with the OFED core 160, one instance per device, e.g., network adapter, is effectively a resource allocator and is more analogous to a Virtual Machine Manager (VMM) than a traditional NIC/FC driver, with the distinction being that the device drivers are dynamic whereas VMM persists for the lifetime of an associated virtual machine (VM). The device driver instances are accessed, by the ULPs, through the verbs of the OFED library 130 and/or OFED core 160 to allocate resources on specific device/device driver pairs, e.g., network adapter/adapter driver pairs.

When a userspace application requests the creation of a RDMA communication pathway between the userspace application and a device, such as an IO adapter, so as to perform RDMA operations, the userspace application creates userspace resources, such as QPs, CQs, and the like, and performs a system call to the operating system kernel which performs operations to register these resources with the device, hereafter referred to as the IO adapter. The operating system kernel essentially communicates the virtual address, length, and other properties of the resources for the communication connection with the userspace application to the TO adapter and then hands-off the responsibility for the data communication between the userspace application and the IO adapter to the IO adapter to thereby facilitate the RDMA operations. Thereafter, the userspace application and the IO adapter communicate with one another via the resources without having to perform copy operations of data to the kernelspace and involve the operating system in such data communications. Control communications may still be passed to the operating system kernel, such as event communications and the like, but data communication is handled via RDMA operations between the IO adapter and the userspace application using the registered resources, e.g., QPs, CQs, and the like.

In addition to creation of the userspace resources, e.g., QPs, CQs, and the like, the operating system kernel further creates shadow copies of these userspace resources in the kernelspace. It again should be appreciated that these resources comprise the metadata that describes the actual data and does not include the data itself. Thus, the storage of shadow copies of the resources is at minimal cost. The userspace resources, and thus, the kernelspace shadow copies of these resources, have associated resource identifiers, memory addresses, and length properties. This information is registered with the kernel and stored in a mapping data structure in kernelspace and may be used to perform lookup operations and identify the locations of these resources in the userspace and kernelspace of the system memory. For example, when an error occurs, the error notification from the IO adapter may specify the specific type of error event as well as a resource identifier corresponding to the error event. This resource identifier may be used by a kernelspace IO adapter driver, for example, to perform a lookup operation of the resource identifier to acquire the address of the kernel shadow copy of the resource.

In addition, the kernelspace, when registering the IO adapter, further creates an event queue (EQ) through which the IO adapter may notify the kernel of events that occur with regard to RDMA connections between the IO adapter and userspace applications, e.g., error event notifications may be posted to this EQ. Moreover, the kernel may create a flight recorder in the kernelspace, which is a portion of the kernel-space memory that may be used to store the contents of a resource in the event of an error event occurring. One of the most common examples of such errors is a userspace application passing an invalid or unexpected parameter to the IO adapter. For example, the data that is to be transmitted through the IO adapter may start at an address that the user application does not have access rights to. As another example, the userspace application may inform the IO adapter that the data to be transmitted has a size of 0 (which is not valid). Any number of parameter combinations that do not make sense to the IO adapter at the time, mainly because of an error in the user application programming, may be the cause of such an error. Errors may also originate with the IO adapter driver, the IO adapter's firmware, or any other potential source of such errors.

The flight recorder stores snapshots of these resources which are then torn down in a standard manner, i.e. using the de-facto operational behavior of stateful IO offload mentioned previously which causes the close of the connection/resource on error detection. Thus, prior to this closing of the connection/resource, and loss of any contents, state, or context information associated with this connection/resource for error analysis, the illustrative embodiments provide mechanisms for storing a snapshot copy of this information in another location of the kernelspace for later use.

Figure 2:
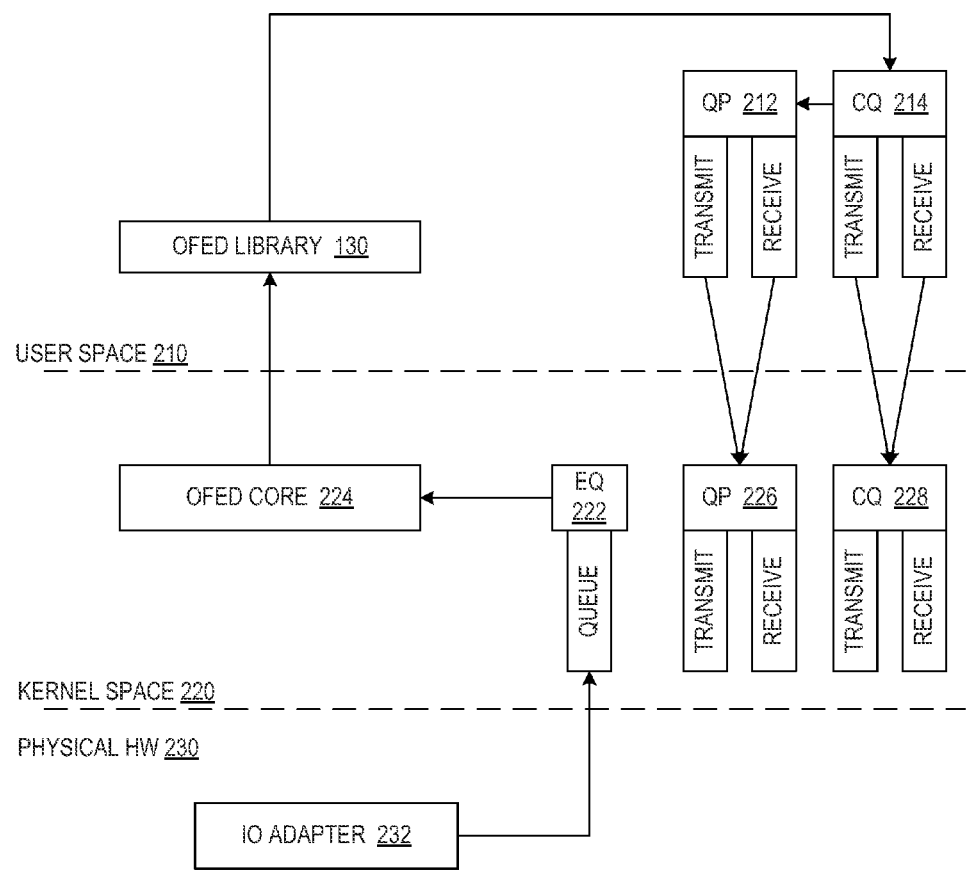
FIG. 2 is an example block diagram illustrating the operation of elements of an OFED™ based architecture with regard to error event notifications being sent from the IO adapter to the host system.

FIG. 2 is an example block diagram illustrating the operation of elements of an OFED™ based architecture with regard to error event notifications being sent from the IO adapter to the host system. As shown in FIG. 2, while the userspace 210 resource, e.g., QP 212 or CQ 214 is operational, events/interrupts occur via an Event Queue (EQ) 222. The events are either notifications of work completions or asynchronous error notifications. Work completion event notifications are sent from the IO adapter 232 in the physical hardware level 230 to the EQ 222 in the kernelspace 220. The OFED™ core 224 reads the event notifications from the EQ 222 and processes them using the OFED™ core 224 services and invoking the OFED™ library 130. For example, if the event notification is a work completion event, the OFED™ core 224 services may invoke the OFED library 130 to perform operations for posting a completion queue entry to the completion queue 214 indicating completion of a work queue entry in a transmit or receive work queue of the QP 212. As a result, the corresponding QP 212 entry is updated to indicate completion of that work request. As updates are performed to the resources, i.e. QP 212 and CQ 214, the updates are copied to the shadow copies 226, 228 of these resources 212, 214 in the kernelspace 220.

If the event notification is an error event, the event notification is again posted to the EQ 222 and read by the OFED™ core 224. However, in accordance with the illustrative embodiments, the OFED™ core 224 is augmented to include logic for handling event notifications such that a snapshot of resource contents, context information, and the like, is created in a flight recorder in the kernelspace 220. For example, a kernelspace IO adapter device driver may be provided for implementing this snapshot in response to intercepting an event notification for the IO adapter 232. The kernelspace IO adapter device driver may further notify the OFED™ core of the error condition by posting the error notification to the EQ 222 such that the OFED™ core may perform its normal operations for tearing down resources when an error event occurs.

Figure 3:
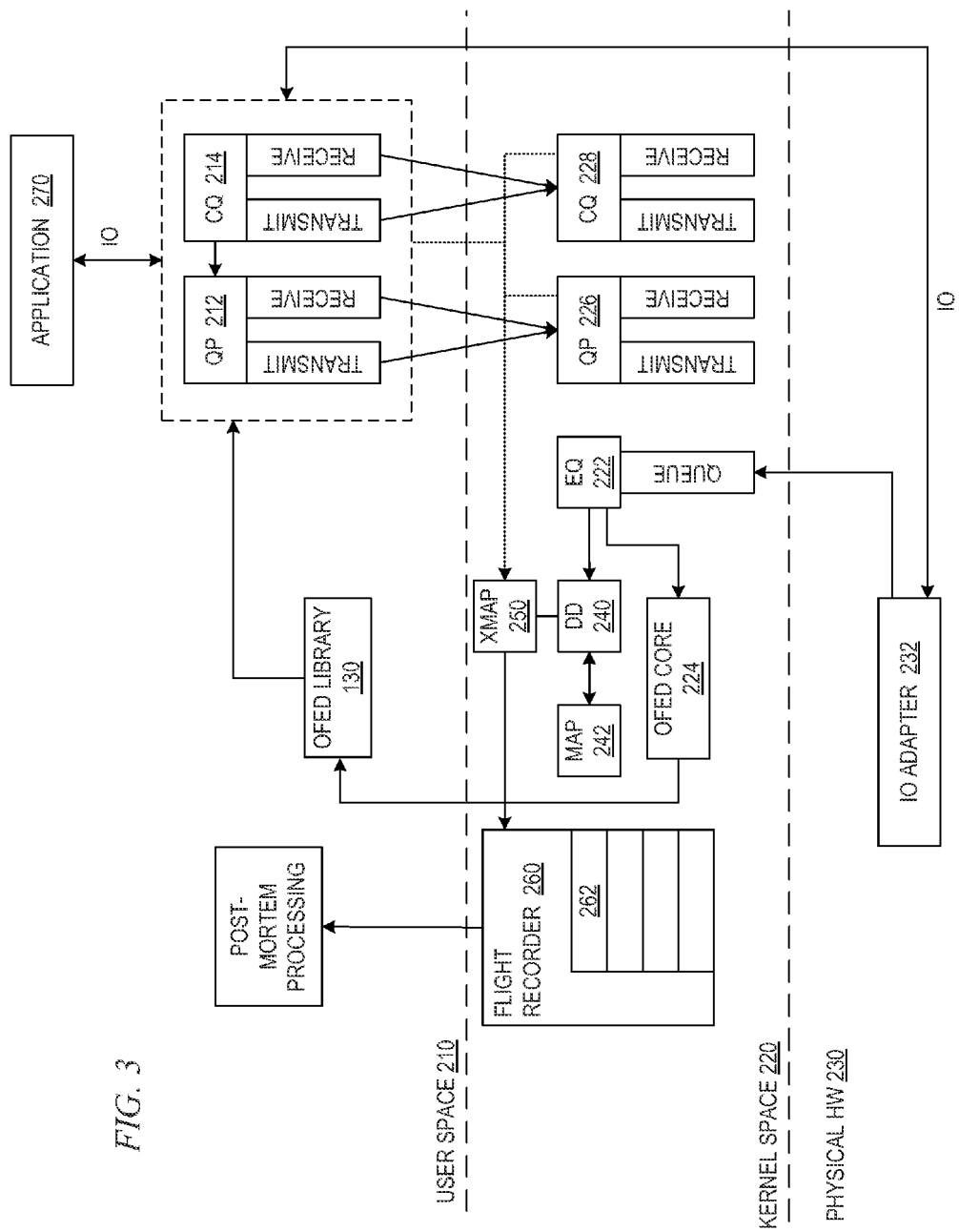
FIG. 3 is an example block diagram of elements and their operation when handling an error notification in accordance with one illustrative embodiment.

FIG. 3 is an example block diagram of elements and their operation when handling an error notification in accordance with one illustrative embodiment. As shown in FIG. 3, in addition to the elements described above with regard to FIG.

2 and the handling of event notifications for work request completions, the illustrative embodiments further provide logic in the kernelspace for handling error notifications from the IO adapter 232 indicating an error event occurring with a RDMA connection between a userspace application 270 and the IO adapter 232. The additional logic is provided, in this example embodiment, as a kernelspace adapter device driver (DD) 240 which operates with resource mapping data structure 242 and cross memory (xmap) services 250 associated with the OFED™ core 224 to facilitate the generation of a snapshot of userspace and kernelspace resources associated with the connection experiencing the error event, in the flight recorder data structure 260 in the kernelspace 220. While this example embodiment illustrates the logic being provided in a kernelspace adapter device driver 240, it should be appreciated that this is but one example, and the logic may be implemented in many different ways including as part of the OFED™ core 224, as a separate logic element altogether within the kernelspace, or the like.

With reference to FIG. 3, when an error event occurs in association with a RDMA connection between the application 270 and the IO adapter 232, the IO adapter 232 raises an interrupt to the host system via First Level Interrupt Handler (FLIH), Second Level Interrupt Handler (SLIH) sequence. That is, when an IO adapter triggers an interrupt, it is first handled by the operating system as a generic interrupt since, at this point, the operating system does not know what driver has registered the interrupt. The operating system in this scenario is the FLIH. Once the FLIH determines what driver originally registered the type of interrupt it received, the FLIH passes that interrupt down to the corresponding driver's interrupt handler. The driver's handler is the SLIH and it is a function implemented in the driver's code that will analyze the interrupt further to determine what kind of asynchronous event the adapter is reporting.

The interrupt being raised results in an error event notification being posted to the EQ 222. This error event notification contains the specific error event information along with a resource identification for the resource associated with the error event. The resource identification may comprise an enumerated value corresponding to the resource, e.g., QP number, CQ number, or the like, which is assigned to the resource at resource creation time and maintained along with other resource configuration information in the kernelspace 220, such as in the resource mapping data structure 242.

The kernelspace IO adapter device driver 240 reads entries in the EQ 222 and determines if an entry in the EQ 222 corresponds to an error event notification. If so, the kernelspace IO adapter device driver 240 (hereafter referred to simply as the "device driver" 240) performs a lookup operation in the resource mapping data structure 242 of the resource identifier to retrieve a corresponding entry that identifies the address of the kernelspace shadow copy 226, 228 of the resource associated with the error event notification and identified by the resource identifier.

That is, when the resource is created, e.g., QP 212 and/or CQ 214, as mentioned above, the resource identifier is assigned to the resource, corresponding address and length information is determined and communicated to the IO adapter 232 for use in performing RDMA operations, and a shadow copy of the resource may be created in the kernelspace 220. As such, the address of the shadow copy of the resource may be associated with the resource identifier of the resource along with the address and length information of the userspace resource, and other configuration information for the userspace resource, in the resource mapping data structure 242. Thus, a lookup of the resource identifier specified in an error event notification posted to the EQ 222 provides the corresponding address of the shadow copies of the userspace resource.

Once the address for the shadow copy of the userspace resource is obtained from the lookup operation, the device driver 240 accesses the cross memory map (xmap) service 250 to obtain the xmap information from when the resource was created to perform a cross memory read operation on the userspace resource. Again, it should be appreciated that the resource is essentially a description of memory where the actual resource is stored and thus, the shadow copy of the resource is likewise the description of memory where the actual resource is. However, the description of where the resource is in memory is in terms of userspace memory because the shadow copy is a copy of whatever the userspace application passed when it created the resource during initialization. Thus, if one wants to access the memory described by the address in the shadow copy of the resource, one needs to translate that userspace address to the kernelspace. The xmap information gives the IO adapter driver the information needed to access the memory referred to by the userspace memory. This translation is useful at this time because if the userspace application terminates (and with it the userspace address space associated with the application), it would not be possible to locate the userspace address space again. The lookup operation in the xmap information is based on a resource identifier. Each resource has a resource identifier but, depending on where the resource is (kernel driver, OFED library, or adapter have their own identifiers for a resource), the resource identifier will vary so that the resource mapping data structure 242 maps resource identifiers across these various domains to uniquely identify a resource.

The cross memory read operation is an operation that allows the userspace application and the operating system kernel to access the same portion of memory when normally the userspace application cannot access the kernelspace memory and vice versa, as previously discussed above. By virtue of performing the cross memory read operation, the contents of the userspace resource are written to the flight recorder 260 by the device driver 240 such that a snapshot of the userspace resource, e.g., QP 212 and/or CQ 214, is captured in a flight recorder entry 262. The flight recorder entry 262 should be sufficiently large in storage size to contain the resource contents. In this way, the userspace resource is captured in the snapshot and available in the kernelspace 220.

In addition, the kernelspace shadow copy QP 226 is also copied into the flight recorder entry 262 so as to capture every component, i.e. the resource itself and its descriptor information (in the shadow copy), regardless of the address space which composes the QP. That is, as described above, the shadow copy QP 226 stores the resource descriptor for the QP. There is a resource descriptor userspace memory as well, with the shadow copy QP 226 being a copy of that userspace resource descriptor. However, if one were to want to access the userspace resource descriptor, the userspace address needs to be saved in kernelspace and an xmap operation would need to be performed to perform a cross-memory read operation of the userspace resource descriptor. To avoid having to implement these extra features, the illustrative embodiments create a shadow copy of the resource descriptor, e.g., a shadow copy QP 226, since the size of the resource descriptor is small and the performance gains of having the shadow copy are relative large (saving having to perform the xmap operation every time an access to a resource descriptor from the IO adapter driver is required). Hence, in addition to storing the actual resource in the flight recorder entry 262, the resource descriptor in the shadow copy QP 232 is also stored for completeness. Moreover, the information in the resource descriptor, which essentially points to the userspace address space associated with the resource, may be useful in various debugging cases including if one were to want to know if there is a memory leak, or the like.

Once the kernel shadow copy of the resource identified in the event notification posted to the EQ 222 is identified by the device driver 240 via the lookup operation and the snapshot is created in the flight recorder entry 262 in the flight recorder data structure 260 of the kernelspace 220, the OFED core 224 may process the error event notification in the EQ 222 to thereby notify the OFED core 224 of the error condition of the resource. The OFED core 224 may dispatch a thread to perform a notification to the hardware specific device driver library, e.g., hardware specific device driver library 140 in FIG. 1, associated with the application 270. This will in turn transfer execution to a userspace thread which polls the CQ 214 for work completions. A CQ work completion will state that the QP is in an error state. That is, the IO adapter writes an entry to the CQ when the IO adapter has to communicate something to the userspace application. Normally, the IO adapter posts work completions in response to work requests processed from the QP. These completions may report an error if the IO adapter detected an error. The CQ is polled in response to an interrupt pointing to an EQ entry that contains the index of the CQ to process.

In response to the error state being notified to the application 270, the application 270 may initiate a tear down operation for removing the resource that is in an error state and resources related to that error state resource, e.g., resources related to a QP 212 that is in an error state. For example, hardware contexts (storing information about the session between the userspace application and the IO adapter including the CQ identifier, PD identifier, and the like), hardware state information, and relationships between these RDMA resources are torn down or destroyed. The IO adapter frees memory associated with the resource descriptors of the resource and its related resources, e.g., the memory used to store the metadata identifying the location of the CQ associated with the QP that is in an error state may be freed as well as the memory for implementing the QP. The user application itself may free the memory of the resources themselves.

It should be appreciated that the above process, while described as being used to perform error event processing with regard to a userspace resource, can also be applied to kernelspace only resources, e.g., kernelspace QPs for example. Under a kernelspace only model, however, the following changes may be employed. First, the operations for accessing xmap information and capturing the userspace resource contents are not performed since a userspace resource is not involved. Second, rather than the kernelspace shadow copy of the resources being a shadow copy, these resources are the actual resources for the kernelspace and thus, when copying in the contents of the kernelspace shadow QP into the flight recorder 260, it is the actual contents of the live resource that is being copied into the flight recorder 260. Third, there is no OFED core 224 dispatching of a userspace thread to perform notification to the userspace hardware specific driver library or the polling of the CQ for work completions by a userspace thread since the resources are in the kernelspace 220.

Having generated a snapshot of the contents, state, and context information associated with a resource that is in an error state, and any related resources, and stored this snapshot in a flight recorder data structure 260, other processes may be employed to process the snapshot to perform various operations based on the detected error event. For example, the snapshot data may be output to a userspace process for outputting the information to a user for review, sending a notification to another data processing system for use, for performing analysis on the snapshot data to determine a root cause of the error event, or any other suitable post-mortem operation. It should be appreciated that typically such post-mortem processing is not possible with present RDMA architectures that utilize fully stateful IO offload since, as noted above, the resources are typically torn down immediately in response to the detected error event.

Figure 4:
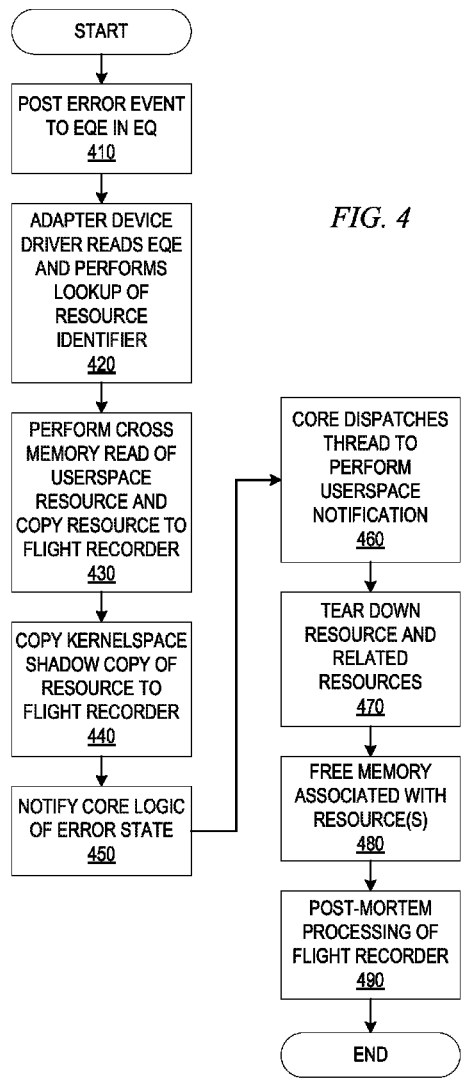
FIG. 4 is a flowchart outlining an example operation for generating a flight recorder entry storing a snapshot of a resource in response to an error event in accordance with one illustrative embodiment.

FIG. 4 is a flowchart outlining an example operation for generating a flight recorder entry storing a snapshot of a resource in response to an error event in accordance with one illustrative embodiment. The operations outlined in FIG. 4 may be implemented, for example, in kernelspace logic provided as software instructions executed by one or more hardware devices, firmware, hardware logic elements, or any combination of software and hardware elements.

As shown in FIG. 4, the operation starts with the posting of an error event notification from an IO adapter into the event queue (EQ) as an event queue entry (EQE) (step 410). The kernelspace IO adapter device driver reads the EQE and performs a lookup operation based on the resource identifier in the EQE to identify an address of a kernelspace shadow copy of the resource identified by the resource identifier (step 420). The kernelspace IO adapter device driver then invokes xmap services to perform a cross memory read of the userspace resource to copy into a flight recorder entry the contents, state, and context information for the userspace resource identified by the resource identifier in the EQE (step 430). The kernelspace IO adapter device driver further copies the contents, state, and context information for a corresponding kernelspace shadow copy of the resource (step 440).

Core logic of the kernel, e.g., an OFED™ core is notified via the EQ and the kernelspace IO adapter device driver, that the resource identified by the resource identifier is in an error state (step 450). The core logic dispatches a thread to perform a notification to a userspace hardware specific device driver library associated with an application with which the resource is associated (step 460). The hardware specific device driver library then performs operations to tear down the resource identified by the resource identifier and all other resources related to the identified resource (step 470). Memory associated with these resources is then freed (step 480). Thereafter, post-mortem processing of the snapshot of the userspace and kernelspace versions of the resource contents, state, and context information may be performed using the kernelspace resident flight recorder (step 490). The operation then terminates.

Thus, with the mechanisms of the illustrative embodiments, a snapshot of a RDMA resource is able to be stored prior to tearing down the resource and its related resources as is generally done by fully stateful IO offload architectures. This snapshot preserves content, state, and context information associated with the resource for use in post-mortem processing which assists with various error related processes including root cause analysis, error recovery, user error notifications, and the like.

Figure 5:
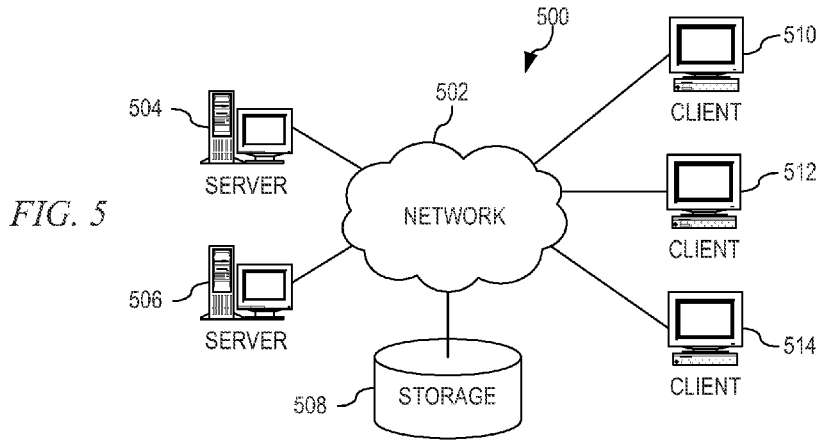
FIG. 5 is an example diagram of a distributed data processing system in which aspects of the illustrative embodiments may be implemented.
Figure 6:
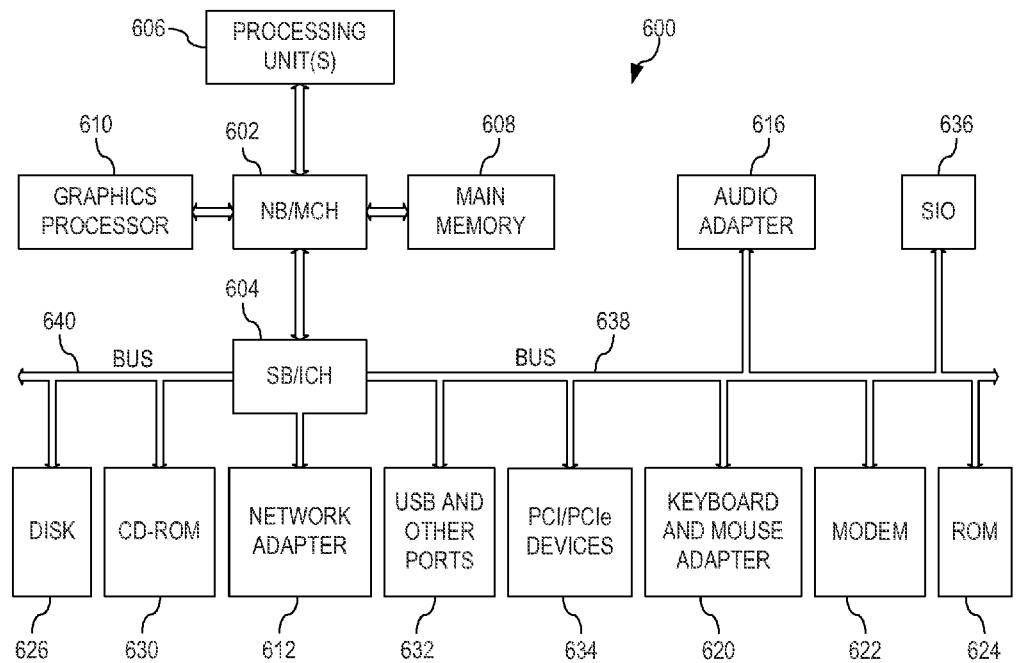
FIG. 6 is an example block diagram of a computing device in which aspects of the illustrative embodiments may be implemented.

It should be appreciated that the illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

FIG. 6 is a block diagram of an example data processing system in which aspects of the illustrative embodiments may be implemented. Data processing system 600 is an example of a computer, such as client 510 or server 504 in FIG. 5, in which computer usable code or instructions implementing the processes for illustrative embodiments of the present invention may be located.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 226 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 600.

As a server, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

In accordance with the illustrative embodiments described herein, the operating system kernel and corresponding kernelspace may implement core logic that supports RDMA operations and provides the additional logic for performing snapshot creation of resources in a flight recorder data structure maintained in the kernelspace in the event of an error occurring in association with RDMA resources of a RDMA connection between a userspace application and a RDMA enabled, and stateful IO offload enabled, IO adapter. Examples of such a core logic include an OFED core, an InfiniBand core, an iWarp core, and the like. The userspace may utilize an architecture in which resources are allocated in the userspace for performing RDMA operations between an application and the IO adapter. Thus, the computing system architectures shown in FIGS. 5 and 6 are just examples in which the mechanisms of the illustrative embodiments may be implemented and may be modified in any suitable manner to facilitate such implementation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating a snapshot of a remote direct memory access (RDMA) resource, the method comprising:
   receiving, by the data processing system, from an Input/Output (IO) adapter associated with the data processing system, an error event notification;
   storing, by the data processing system, in response to the error event notification, a snapshot of a RDMA resource associated with the error event notification;
   tearing down, by the data processing system, the RDMA resource in response to the error event notification; and
   freeing, by the data processing system, memory associated with the RDMA resource in response to tearing down the RDMA resource, wherein the snapshot stores contents of the RDMA resource, wherein the snapshot is stored in kernelspace in a flight recorder data structure of an IO adapter device driver corresponding to the IO adapter, and wherein storing the snapshot comprises performing invoking a cross memory map (xmap) service of a kernel to perform a cross memory read of the userspace RDMA resource and performing a write of the contents of the userspace RDMA resource into an entry in the flight recorder data structure.

2. The method of claim 1, wherein the snapshot of the RDMA resource associated with the error event notification comprises contents of the RDMA resource obtained from the RDMA resource and a resource descriptor obtained from a kernelspace shadow copy of the RDMA resource.

3. The method of claim 1, wherein the RDMA resource is a kernelspace RDMA resource.

4. The method of claim 1, wherein the error event notification comprises a resource identifier of a resource associated with an error event detected by the IO adapter, and wherein storing the snapshot comprises performing a lookup operation in an mapping data structure, of cross memory map information corresponding to the resource identifier.

5. The method of claim 4, wherein the cross memory map information comprises a location of a shadow copy of the userspace RDMA resource, and wherein storing the snapshot comprises:
   using metadata stored in the shadow copy to perform a cross memory read operation of the userspace RDMA resource and a write of contents of the userspace RDMA resource to the flight recorder data structure; and
   copying the metadata stored in the shadow copy to the flight recorder data structure.

6. The method of claim 1, further comprising:
   performing a post-mortem process on the stored snapshot of the userspace RDMA resource.

7. The method of claim 6, wherein the post-mortem process is one of a root cause analysis process, a user notification process that notifies a user of the error event, or an output process that outputs contents of the snapshot of the userspace RDMA resource.

8. The method of claim 1, wherein the userspace RDMA resource is one of a Queue Pair associated with the IO adapter and a userspace application for performing RDMA operations of an RDMA connection between the userspace application and the IO adapter, or a Completion Queue for receiving notifications of work request completions in association with the RDMA connection between the IO adapter and the userspace application.

9. A computer program product comprising a non-transitory computer readable medium having a computer readable program stored therein, wherein the computer readable program, when executed on a data processing system, causes the data processing system to:
   receive, by the data processing system, from an Input/Output (IO) adapter associated with the data processing system, an error event notification;
   store, by the data processing system, in response to the error event notification, a snapshot of a RDMA resource associated with the error event notification;
   tear down, by the data processing system, the RDMA resource in response to the error event notification; and
   free, by the data processing system, memory associated with the RDMA resource in response to tearing down the RDMA resource, wherein the snapshot stores contents of the RDMA resource, wherein the snapshot is stored in kernelspace in a flight recorder data structure of an IO adapter device driver corresponding to the IO adapter, and wherein storing the snapshot comprises invoking a cross memory map (xmap) service of a kernel to perform a cross memory read of the userspace RDMA resource and performing a write of the contents of the userspace RDMA resource into an entry in the flight recorder data structure.

10. The computer program product of claim 9, wherein the snapshot of the RDMA resource associated with the error event notification comprises contents of the RDMA resource obtained from the RDMA resource and a resource descriptor obtained from a kernelspace shadow copy of the RDMA resource.

11. The computer program product of claim 9, wherein the RDMA resource is a kernelspace RDMA resource.

12. The computer program product of claim 9, wherein the computer readable program further causes the data processing system to:
    perform a post-mortem process on the stored snapshot of the userspace RDMA resource.

13. The computer program product of claim 12, wherein the post-mortem process is one of a root cause analysis process, a user notification process that notifies a user of the error event, or an output process that outputs contents of the snapshot of the userspace RDMA resource.

14. The computer program product of claim 9, wherein the userspace RDMA resource is one of a Queue Pair associated with the IO adapter and a userspace application for performing RDMA operations of an RDMA connection between the userspace application and the IO adapter, or a Completion Queue for receiving notifications of work request completions in association with the RDMA connection between the IO adapter and the userspace application.

15. A data processing system, comprising:
    a processor executing a kernel in a kernelspace and an application in a userspace; and
    an Input/Output adapter coupled to the processor, wherein the processor is configured to:
    receive, from an Input/Output (IO) adapter associated with the data processing system, an error event notification;
    store, in response to the error event notification, a snapshot of a RDMA resource associated with the error event notification;
    tear down the RDMA resource in response to the error event notification; and
    free memory associated with the RDMA resource in response to tearing down the RDMA resource, wherein the snapshot stores contents of the RDMA resource, wherein the snapshot is stored in kernelspace in a flight recorder data structure of an IO adapter device driver corresponding to the IO adapter, and wherein storing the snapshot comprises invoking a cross memory map (xmap) service of a kernel to perform a cross memory read of the userspace RDMA resource and performing a write of the contents of the userspace RDMA resource into an entry in the flight recorder data structure.

16. The data processing system of claim 15, wherein the snapshot of the RDMA resource associated with the error event notification comprises contents of the RDMA resource obtained from the RDMA resource and a resource descriptor obtained from a kernelspace shadow copy of the RDMA resource.

17. The data processing system of claim 15, wherein the RDMA resource is a kernelspace RDMA resource.

18. The data processing system of claim 15, wherein the computer readable program further causes the data processing system to:
    perform a post-mortem process on the stored snapshot of the userspace RDMA resource.

19. The data processing system of claim 18, wherein the post-mortem process is one of a root cause analysis process, a user notification process that notifies a user of the error event, or an output process that outputs contents of the snapshot of the userspace RDMA resource.

20. The data processing system of claim 15, wherein the userspace RDMA resource is one of a Queue Pair associated with the IO adapter and a userspace application for performing RDMA operations of an RDMA connection between the userspace application and the IO adapter, or a Completion Queue for receiving notifications of work request completions in association with the RDMA connection between the IO adapter and the userspace application.

\* \* \* \* \*